US008688653B2

(12) United States Patent
Kim et al.

(10) Patent No.: US 8,688,653 B2
(45) Date of Patent: Apr. 1, 2014

(54) MULTIPLE LANGUAGE SUPPORT SYSTEM AND METHOD FOR APPLICATION

(75) Inventors: Goo-hyun Kim, Anyang-si (KR); Hwa-seon Shin, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 526 days.

(21) Appl. No.: 11/352,302

(22) Filed: Feb. 13, 2006

(65) Prior Publication Data

US 2006/0184356 A1     Aug. 17, 2006

(30) Foreign Application Priority Data

Feb. 16, 2005    (KR) .................. 10-2005-0012817
Feb. 25, 2005    (KR) .................. 10-2005-0016045

(51) Int. Cl.
*G06F 7/00*           (2006.01)

(52) U.S. Cl.
USPC .................. 707/693; 707/802; 704/2; 704/8; 715/703

(58) Field of Classification Search
None
See application file for complete search history.

(56) References Cited

U.S. PATENT DOCUMENTS

| | | | | |
|---|---|---|---|---|
| 4,730,258 | A * | 3/1988 | Takeda et al. .................. 700/86 |
| 5,416,903 | A * | 5/1995 | Malcolm ....................... 715/703 |
| 5,432,935 | A * | 7/1995 | Kato et al. .................... 719/320 |
| 5,917,484 | A * | 6/1999 | Mullaney ...................... 715/703 |
| 6,073,090 | A * | 6/2000 | Fortune et al. .................... 704/8 |
| 6,252,589 | B1 * | 6/2001 | Rettig et al. .................. 715/703 |
| 6,377,825 | B1 * | 4/2002 | Kennedy et al. ........... 455/569.2 |
| 6,396,515 | B1 | 5/2002 | Hetherington et al. |
| 6,469,713 | B2 * | 10/2002 | Hetherington et al. ........ 715/740 |
| 6,501,486 | B1 * | 12/2002 | Lau ................................ 715/762 |
| 6,559,861 | B1 * | 5/2003 | Kennelly et al. .............. 715/703 |
| 7,185,289 | B1 * | 2/2007 | Taima ............................ 715/810 |
| 2002/0022954 | A1 * | 2/2002 | Shimohata et al. ............... 704/3 |
| 2002/0181497 | A1 * | 12/2002 | Mano et al. .................... 370/466 |
| 2002/0193985 | A1 | 12/2002 | Park |
| 2003/0046059 | A1 | 3/2003 | Litster et al. |
| 2004/0054745 | A1 * | 3/2004 | Lee ............................... 709/206 |

FOREIGN PATENT DOCUMENTS

| | | |
|---|---|---|
| JP | 7-239768 A | 9/1995 |
| JP | 2000-181650 A | 6/2000 |
| JP | 2003-015873 A | 1/2003 |
| JP | 2004-097283 A | 4/2004 |
| KR | 2001-0017874 A | 3/2001 |
| KR | 2002-0030666 A | 4/2002 |
| KR | 2003-0054194 A | 7/2003 |
| KR | 10-2004-0087423 A | 10/2004 |

OTHER PUBLICATIONS

Office Action dated May 18, 2010, issued in counterpart Japanese Application No. 2007-555023.
Office Action dated Nov. 24, 2010, issued in counterpart Japanese Application No. 2007-555023.
Technician Status Report dated Jun. 10, 2011 from the Spanish Office of Patents and Trademarks in counterpart Spanish application No. 2007/50050.

* cited by examiner

*Primary Examiner* — Fred I Ehichioya
*Assistant Examiner* — Hasanul Mobin
(74) *Attorney, Agent, or Firm* — Sughrue Mion, PLLC

(57) ABSTRACT

A multiple language support system and method. The multiple language system includes a multiple language support system for an application, the system includes a resource data generation unit to generate resource data for the language of the application, a resource data processing unit to extract resource data from the generated resource data by language of the system environment on which the application is executed, and convert the extracted resource data into the language of the application, and a resource data management unit to manage the resource data used in the application.

12 Claims, 10 Drawing Sheets

```
reg DB language Sub key:
    ID : language ID
        // Define language ID
        #define LID_LANGUAGE_NEUTRAL         0x0000
        #define LID_DYDTEM_DEFAULT           0x0800
        #define LID_TRADITIONAL_CHINESE      0x0404
        #define LID_ENGLISH_US               0x0409
        #define LID_JAPANESE                 0x0411
        #define LID_KOREAN                   0x0412
        #define LID_SIMPLIFIED_CHINESE       0x0412
                    •
                    •
                    •
        ChangeLanguage                       113
```

FIG. 3 reg DB language Main Key:

Software\samsung\\JungUmGlobal\\JungUm Global\\Resource Language

FIG. 4

```
HMODULE       LoadSatelliteDLL(LPCTSTR pPath, LANGID DesiredLAnguage, LPCTSTR pPrefix);
LANGID        DetectLanguage();
LANGID        GetDefinedResourceLanguageID();
LANGID        GetNTDLLNativeLangID();
BOOL CALLBACK EnumLangPro(HANDLE hModule, LPCTSTR lpszType, LPCTSTR lpszName,
              WORD wIDLanguage, LONG_PTR lParam);
```

FIG. 5

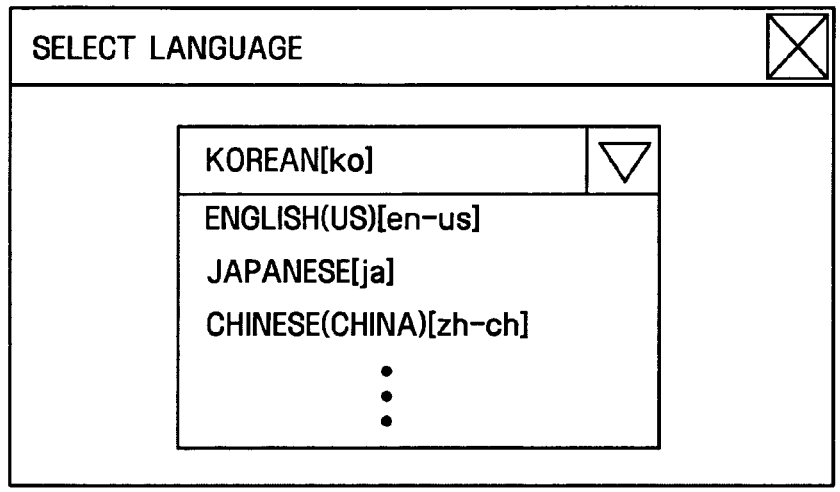

MULTIPLE LANGUAGE SUPPORT SYSTEM AND METHOD FOR APPLICATION

CROSS-REFERENCE TO RELATED APPLICATIONS

This application claims priorities from Korean Patent Application Nos. 10-2005-0012817 and 10-2005-0016045 filed on Feb. 16, 2005, and Feb. 25, 2005, respectively, in the Korean Intellectual Property Office, the disclosures of which are incorporated herein in their entireties by reference.

BACKGROUND OF THE INVENTION

1. Field of the Invention

Apparatuses and methods consistent with the present invention relate to multiple language support for an application.

2. Description of the Related Art

Generally, operating systems employ separate applications for different languages. For example, when an application is executed in two different operating systems supporting Korean and English, separate versions (Korean and English) are used.

For example, where an operating system "A" and an operating system "B" support a language "A" and a language "B," respectively, operating system "A" must use an application "A" in language "A", and operating system "B" must use an application "B" in language "B". The operating systems "A" and "B" each include a set of functions to convey information on environmental variables required by the applications "A" and "B.".

Accordingly, the applications "A" and "B" respectively request required environmental variables through the set of functions that the operating systems "A" and "B" supply, and receive responses to their requests. However, if the operating system and the application support different languages, the operating system cannot understand the environmental variables requested by the application; thus, there is a need to produce a separate application to support the same language as the operating system.

As described above, to use an application in another language, the application has to be produced differently according to the linguistic environment. In other words, with respect to source code of a concerned application, the text should be converted and complied in the language supported by the concerned operating system. The application needs to be rebuilt based on each language when converting the text of the application, and managed on a language basis. This makes it difficult to maintain the application, and it requires significant time and effort to maintain.

Japanese Unexamined Patent Publication No. 12-181650 discloses a data processing apparatus capable of using a printer driver by copying resources for the languages of various countries through a recording medium or a communication line, and installing the linguistic resource corresponding to the language and the font selected by a user when installing the printer driver. However, it is difficult to apply this invention to all applications. Further, it discloses no solution to the problem caused when the operating system and the application are in different languages.

SUMMARY OF THE INVENTION

Accordingly, the present invention has been proposed to solve the problems described above. An object of the present invention is to provide a multiple language support system and a method for an application, capable of changing the language used in the application according to the language supported by the system environment on which the application is executed, by allowing the application to be supported with multiple languages.

Another object of the present invention is to provide multiple language support system and method for an application whereby the application can be executed independently of the language supported by the system environment, by converting the language transmitted between the application and the system environment adaptively to the application and the system environment respectively.

The present invention shall not be limited to the objects described above. Any other object(s) not described herein shall be clearly understood by those skilled in the art from the descriptions stated below.

According to an aspect of the present invention, there is provided a multiple language support system for an application including a resource data generation unit to generate resource data by languages of the application, a resource data processing unit to extract resource data by languages of system environment on which the application is executed, from the generated resource data, and convert the extracted resource data into the language of the application, and a resource data management unit to manage the resource data used in the executed application.

According to another aspect of the present invention, there is provided a multiple language support method for an application including generating resource data by languages of an application based on various countries, extracting resource data by languages of system environment on which the application is executed, from the generated resource data, and converting the language of the application according to the extracted resource data, and storing the resource data used in the executed application.

BRIEF DESCRIPTION OF THE DRAWINGS

The above and other features and advantages of the present invention will become more apparent by describing in detail exemplary embodiments thereof with reference to the attached drawings in which:

FIG. 3 illustrates data on a language selected by a user according to an exemplary embodiment of the present invention;

FIG. 4 illustrates a function to apply resource data to an application according to an exemplary embodiment of the present invention;

FIG. 5 illustrates a graphical user interface through which a language can be selected among languages of various countries according to an exemplary embodiment of the present invention;

DETAILED DESCRIPTION OF EXEMPLARY EMBODIMENTS

Figures 1, 2:
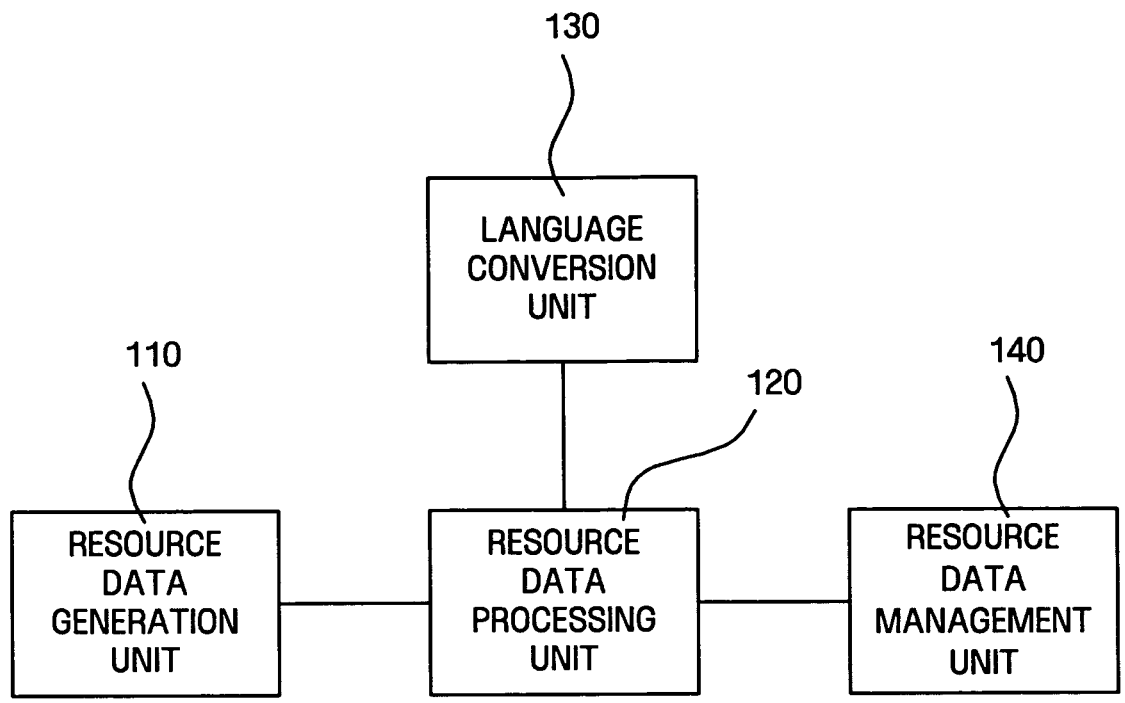
FIG. 1 illustrates a multiple language support system for an application according to an exemplary embodiment of the present invention.
FIG. 2 illustrates resource data generated by a resource data generation unit according to an exemplary embodiment of the present invention.

Hereinbelow, exemplary embodiments of the present invention will be described in detail with reference to the accompanying drawings. Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Exemplary embodiments of the present invention will be described in detail with reference to the accompanying drawings.

FIG. 1 illustrates a multiple language support system for an application according to an exemplary embodiment of the present invention.

The illustrated multiple language support system comprises a resource data generation unit 110 to generate resource data for a language of an application, a resource data processing unit 120 to extract resource data for a language of the system environment on which the application is executed from the generated resource data, and convert the language of the application to be executed according to the extracted resource data, a language conversion unit 130 to convert the language of data transmitted between the application and the system environment, and a resource data management unit 140 to manage the resource data used in the application to be executed.

The resource data generated by the resource data generation unit 110 may be generated by reading resource data for a language from a recording media such as a floppy disk or a compact disk, or by receiving resource data for a language through a communication medium, but the generation of the resource data is not limited to these methods. In the exemplary embodiment of the present invention, the resource data may comprise Menu, Help, Toolbar, Icon, Dialog and Font for a number of languages and information on a concerned country, but it is not limited to these.

The resource data generation unit 110 may store the generated resource data by allotting proper information to each set of generated resource data. Specifically, the resource data generation unit 110 allots predetermined IDs to resource data for languages of various countries, as illustrated in FIG. 2, and stores the generated resource data. The system environment employed in the present exemplary embodiment will be described, by way of example, with reference to an operating system on which a user can execute an application.

To execute a predetermined application on an operating system, the user has to install the concerned application. At this time, the resource data processing unit 120 determines the language of an operating system where the concerned application is to be installed, or the selected language of the application the user is installing. While the application is executing, the user can make the language of the application the same as or different from that of the operating system.

When the user does not select a language, a predetermined language can be used. At this time, resource data on the language selected by the user may be stored as illustrated in FIG. 3. The resource data selected by the user can be stored in the resource data management unit 140 (to be described later).

When the user completes installation of the concerned application and executes the installed application, the resource data processing unit 120 may extract resource data according to the language selected by the user from the resource data generated by the resource data generation unit 110. The extracted resource data may include Menu, Help, Toolbar, Icon, Dialog and Font for the selected language, and information on the concerned country (as described above), and the resource data processing unit 120 applies the extracted resource data to the application.

Specifically, the resource data processing unit 120 extracts the ID of the resource data selected by the user from the resource data shown in FIG. 2 (described above), using the functions GetLanguageID( ) and SetLanguageID(WORD wID), and transmits the extracted ID to apply the extracted resource data to the concerned application (as illustrated in FIG. 4) using the function GetLanguageIDIndex( ). The data applied in the process shown in FIG. 4 may include Menu, Help, Toolbar, Icon, Dialog and Font for a language, and information on the concerned country (as described above). For example, when the user has changed the preset language from Korean to Japanese, the Korean typefaces change to those for Japanese.

When the user executes an application, the resource data processing unit 120 supplies the generated resource data through a predetermined graphical user interface so that the user can change the language. The supplied graphical user interface displays the names of countries linked to each set of resource data as illustrated in FIG. 5, thereby allowing the user to easily confirm the languages by countries and to select the resource data according to the language to be used. When the user changes the country through the graphical user interface illustrated in FIG. 5, the name of a country displayed by the graphical user interface may be outputted in the language of the newly selected country, or in the language set beforehand.

Where the user changes the language in the graphical user interface, the resource data processing unit 120 again extracts resource data according to the new language from the resource data generated by the resource data generation unit 110, and applies the extracted resource data to the concerned application.

The language conversion unit 130 changes the language of data transmitted between the application and the operating system. In other words, the operating system comprises a set of functions including environment variables required by the application, and the application requests the required environment variables through the set of functions, and receives the requested environment variables. At this time, if the languages used by the application and by the operating system are different, they will be unable to communicate.

Accordingly, the application requests an environment variable using the language common to all the applications, and the language conversion unit 130 receives the request, converts the request into the language supported by the operating system and transmits the converted request to the operating system. The language conversion unit 130 also converts the environment variable transmitted from the operating system at the request of the application into the language common to all the applications, and transmits it to the application.

Specifically, the common language "MYPICTURE_FOLDER" is "내문서" in Korean and "My Pictures" in English. In the case where the operating system is in Korean, when the application requests "Copy(MYPICTURE_FOLDER, picture_data)" using the common language "MIPICTURE_FOLDER," the language conversion unit 130 converts it into "Copy(내문서, picture_data)" and transmits it to the operating system. In the case where the operating system is in English, it is converted into "Copy(My Pictures, picture_data)" and is transmitted to the operating system. On the other hand, the response by the operating system to the request prepared in the language of the operating system is converted into the common language that can be understood by all the applications through a reverse process of the request, and is then transmitted to the application. Accordingly, as the application can be executed independently of the language supported by the operating system, the application can be produced independently of the operating system.

Figure 6:
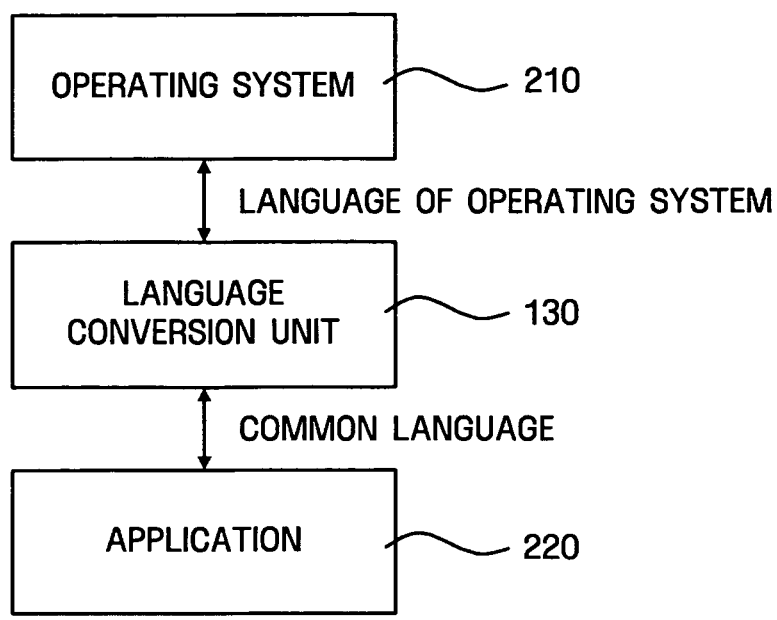
FIG. 6 illustrates a language being converted by a language conversion unit according to an exemplary embodiment of the present invention.

As illustrated in FIG. 6, the language conversion unit 130 allows the language of an operating system to be transmitted to the concerned operating system 210, and the common language to be transmitted to the concerned application 220, whereby the application can be independently executed without producing a separate application to support the language of the operating system 210 even when the languages of the operating system 210 and the application 220 are different. Even when the user selects a predetermined language, the language used in the graphical user interface of FIG. 6 may be retained or changed according to the language selected by the user.

When installing the application, the resource data management unit 140 can manage resource data according to the determined language of the operating system and the language selected by the user in the course of executing the application. Accordingly, when the user terminates the application currently in execution and executes the application again, the resource data management unit 140 determines the selected language and extracts resource data as a result of the determination from the resource data generated by the resource data generation unit 110.

A multiple language support method for an application according to an exemplary embodiment of the present invention will be described. It is assumed that resource data of the concerned application has been generated in advance by the resource data generation unit 110.

Figure 7:
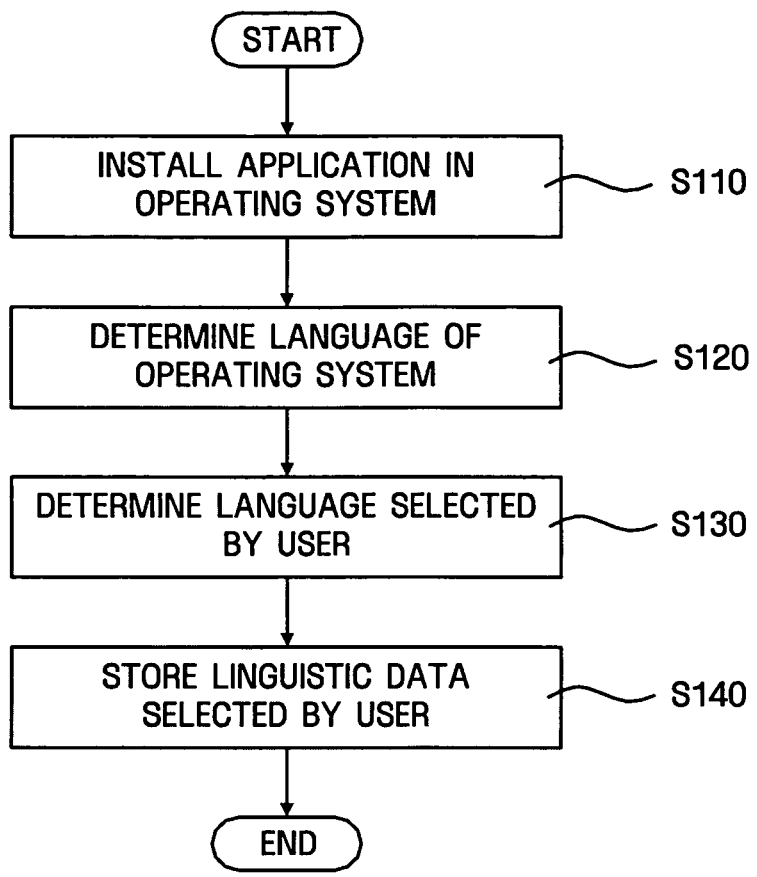
FIG. 7 illustrates a method of storing data on a language selected by a user when installing an application according to an exemplary embodiment of the present invention.

FIG. 7 illustrates a method of setting a language when installing an application according to an exemplary embodiment of the present invention.

As illustrated, a user installs an application in an operating system (S110).

While the application is executing, the resource data processing unit 20 determines the language of the operating system (S120).

The user selects the language of the application (S130). At this time, the installed application supplies a predetermined graphical user interface to allow the user to select the language. As illustrated in FIG. 5, the user selects the language through the supplied graphical user interface. At this time, if the user selects no language, a predetermined language or a default language is used.

Then, data on the language selected by the user is stored in the resource data management unit 140 (S140).

Figure 8:
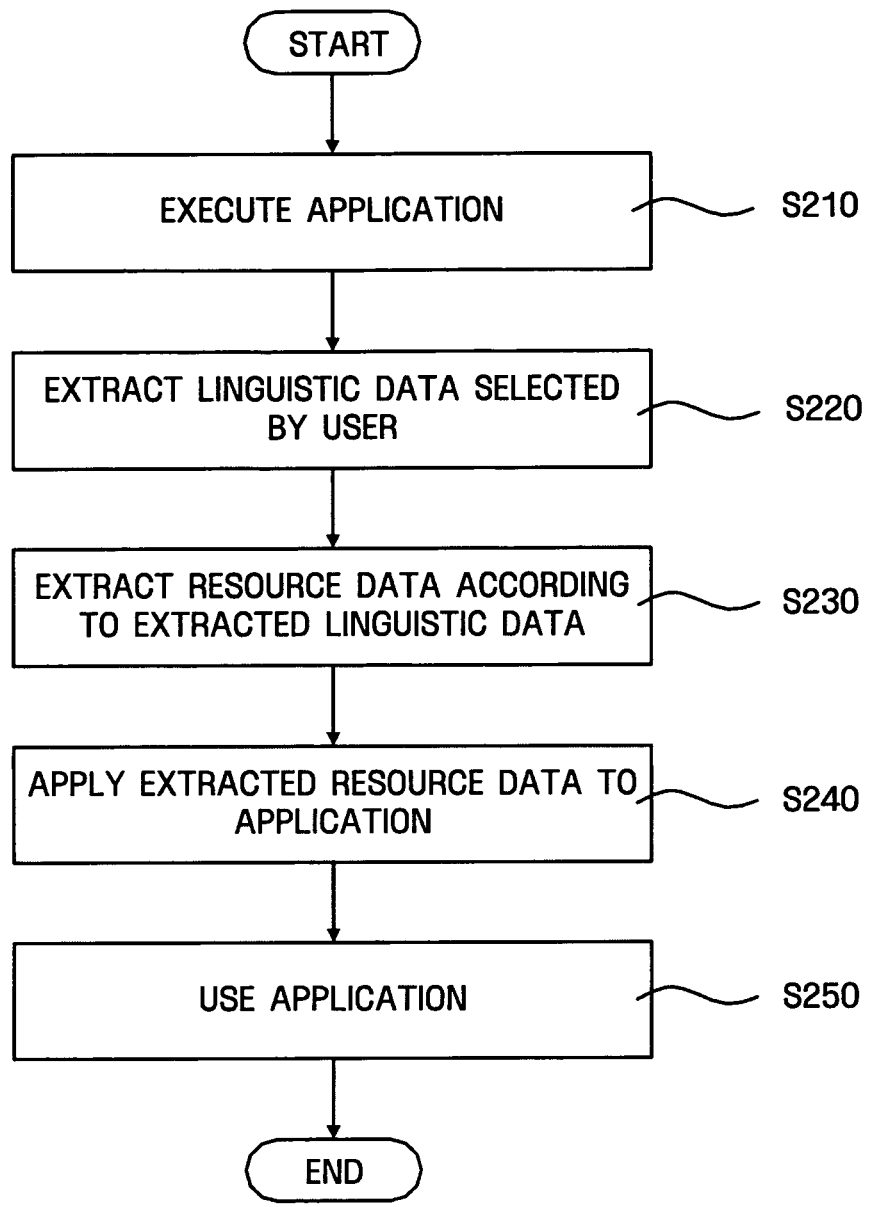
FIG. 8 illustrates a method of applying resource data to the application according to data on a language selected by a user when installing an application according to an exemplary embodiment of the present invention.

FIG. 8 illustrates a method of selecting resource data when executing an application according to the exemplary embodiment of the present invention.

Referring to FIG. 8, the user first executes the concerned application (S210).

Once the application is executed, the resource data processing unit 120 extracts data of the language selected by the user by the resource data management unit 140 (S220). At this time, the extracted linguistic data may be for the language selected by the user, or the language determined in advance or set as the default.

The resource data processing unit 120 extracts the resource data corresponding to the extracted linguistic data from the resource data generated by the resource data generation unit 110 (S230).

The resource data processing unit 120 applies the extracted resource data to the application (S240). At this time, the applied resource data may include Menu, Help, Toolbar, Icon, Dialog and Font for each language, and information on the concerned country (as described above).

Then, the user uses the application (S250).

Figure 9:
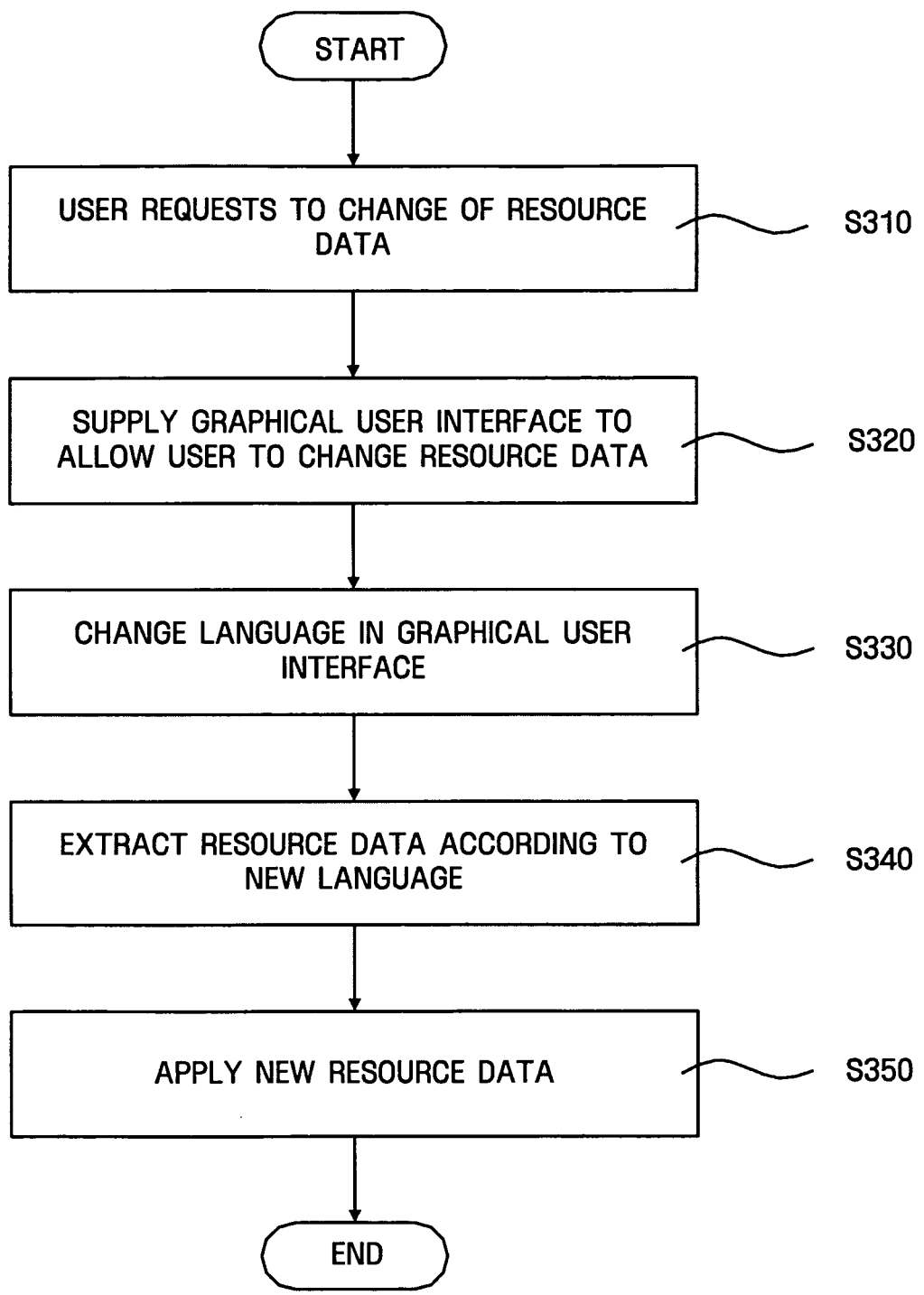
FIG. 9 illustrates a method of changing resource data applied to an application according to an exemplary embodiment of the present invention.

FIG. 9 illustrates a method of changing resource data applied to an application according to an exemplary embodiment of the present invention.

As illustrated, when the user first requests a change of resource data (S310), the resource data processing unit 120 supplies the user with a predetermined graphical user interface in order to change the resource data (S320). The supplied graphical user interface is the same as that shown in FIG. 5.

The user selects a language among various languages displayed on the graphical user interface (S330). At this time, since each resource item is represented in the language of the concerned country, the user can easily change the resource data without knowing the ID of the concerned resource data.

The resource data processing unit 120 extracts resource data corresponding to the language of the country selected by the user from the resource data generated by the resource data generation unit 110 (S340).

The resource data processing unit 120 applies the extracted resource data to the concerned application (S350) so that the user can use the concerned application in the language of the selected country.

Since the resource data managing unit 140 stores the new resource data, the user can execute the concerned program with the new resource data when terminating and re-executing it.

Figure 10:
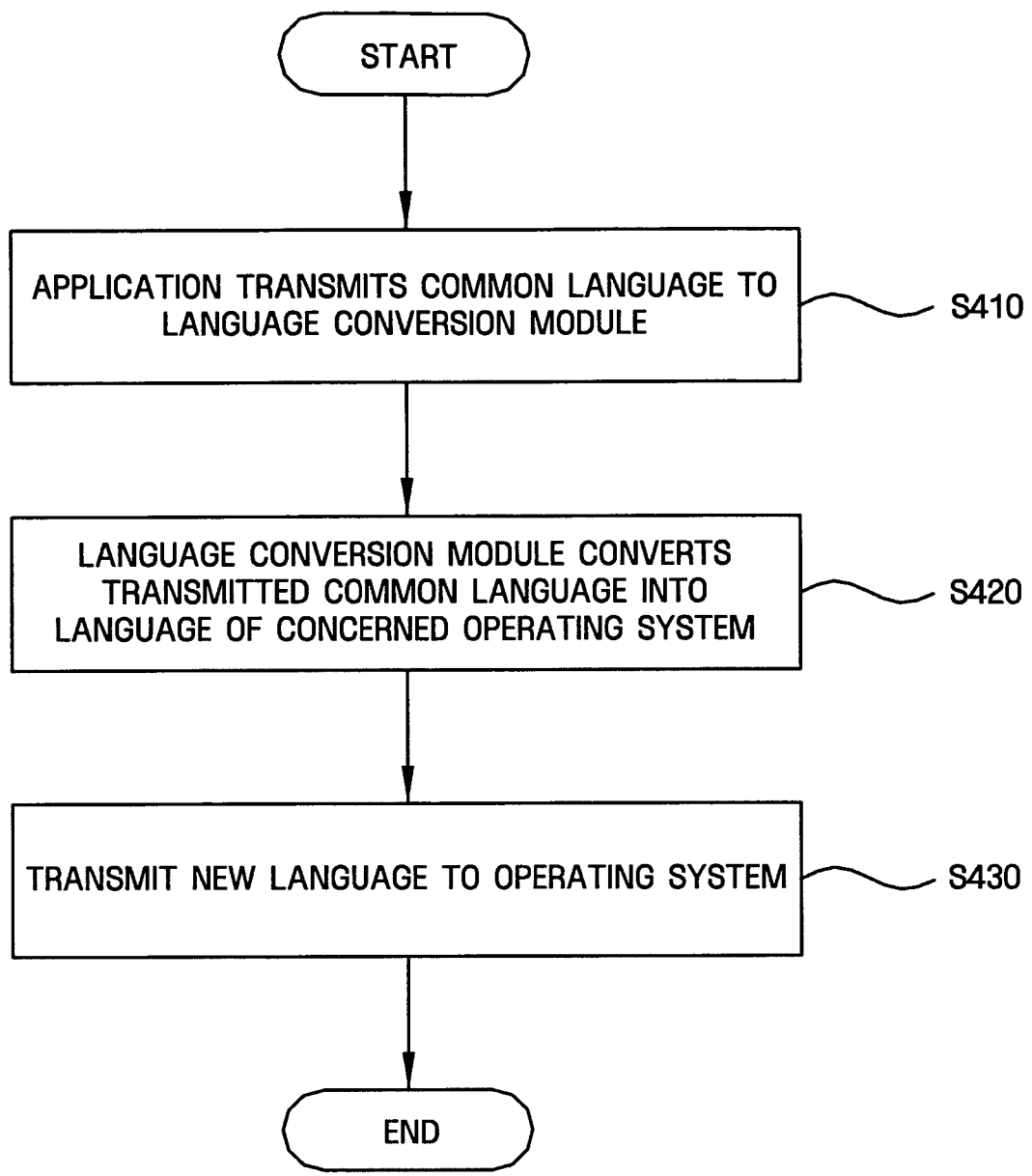
FIG. 10 illustrates a method of converting the language of an operating system to a language transmitted from an application according to an exemplary embodiment of the present invention.

FIG. 10 illustrates a method of converting the language of an operating system to the language transmitted from the application by the language conversion unit 130 according to an exemplary embodiment of the present invention.

As illustrated, the common language is transmitted to the language conversion unit 130 by the application (S410). The transmitted common language is used by all the applications irrespective of the language supported by the operating system.

The language conversion unit 130 converts the transmitted common language into the language supported by the operating system (S420), and transmits the converted language to the operating system (S430).

Figure 11:
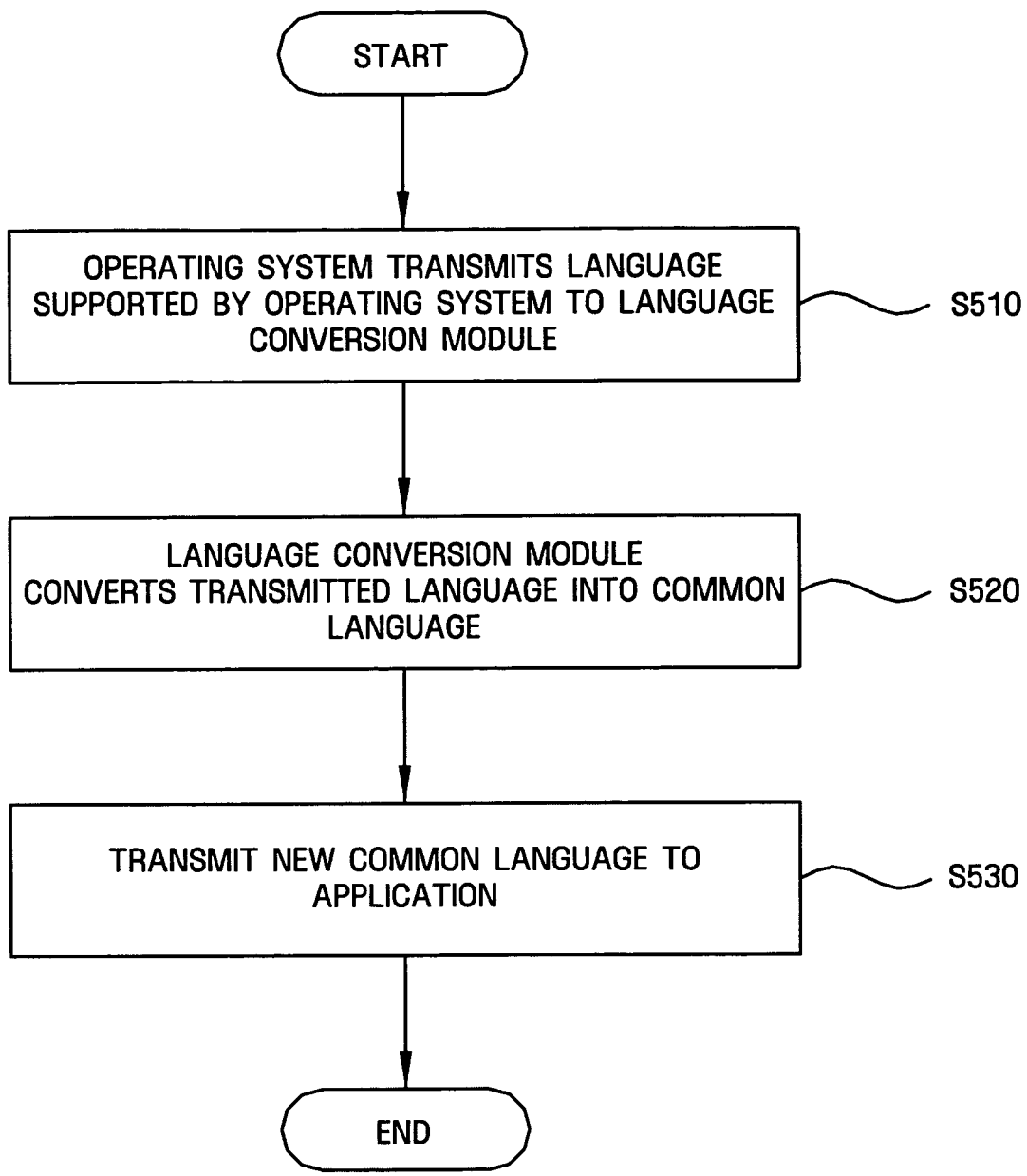
FIG. 11 illustrates a method of converting the language of an application transmitted from an operating system according to an exemplary embodiment of the present invention.

FIG. 11 illustrates a method of the language conversion unit 130 for converting the language transmitted to an application from an operating system according to an exemplary embodiment of the present invention.

As illustrated, the language supported by the operating system is transmitted to the language conversion unit 130 by the operating system (S510).

The language conversion unit 130 converts the transmitted language into the common language that can be used by all the applications (S520), and transmits the converted common language to the application (S530).

Accordingly, since the application can be executed independently of the operating system through the conversion methods of FIGS. 10 and 11, it is possible to produce an application that is independent of the operating system.

Figure 12:
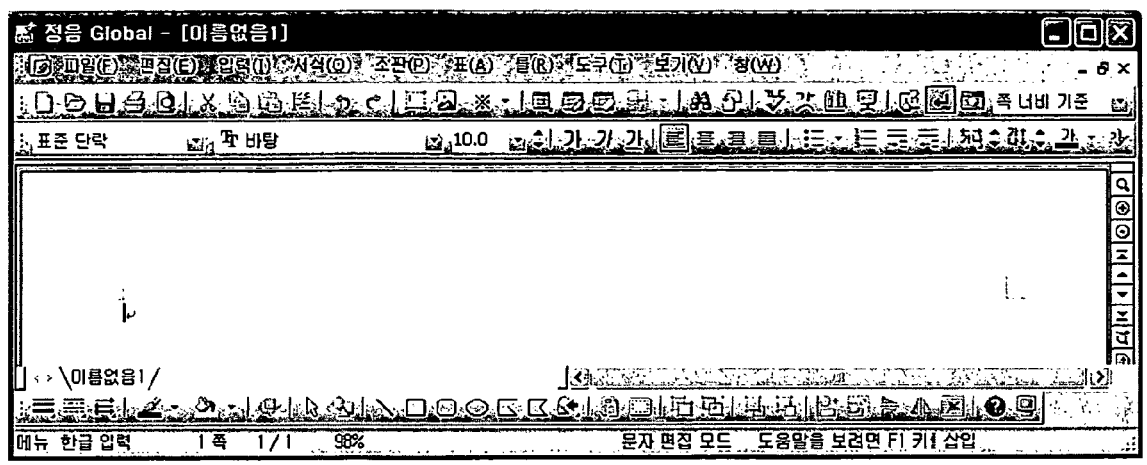
FIG. 12 illustrates a display of an application to which Korean has been applied according to an exemplary embodiment of the present invention.

The processes for changing resource data applied to an application using the multiple language support method according to an exemplary embodiment of the present invention as described above will be described in more detail with reference to FIGS. 12 to 15. It is assumed that the initial language selected by the user is Korean as illustrated in FIG. 12.

When the user intends to change the language of the application to English, Chinese or Japanese, each language can be selected as illustrated in FIG. 5 (described above).

Figure 13:
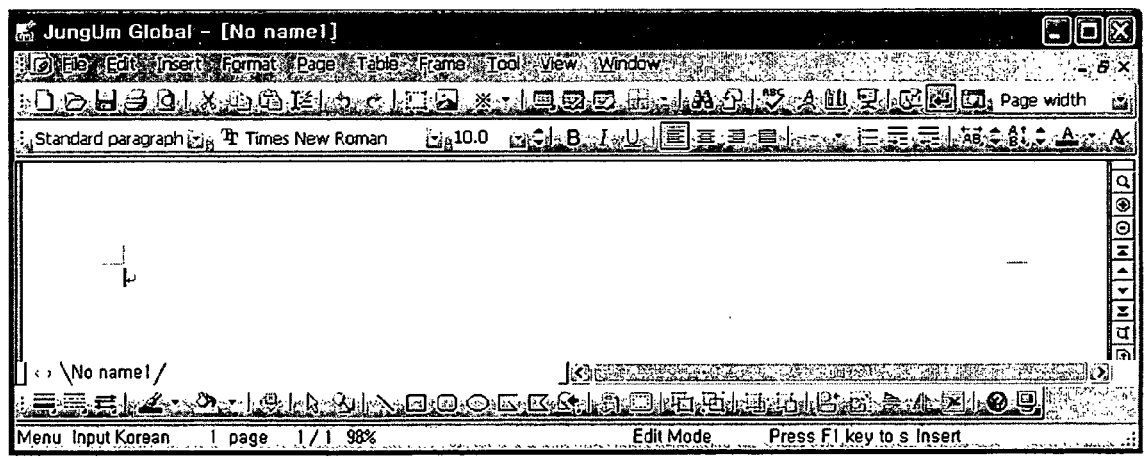
FIG. 13 illustrates a display of an application to which English has been applied according to an exemplary embodiment of the present invention.
Figure 14:
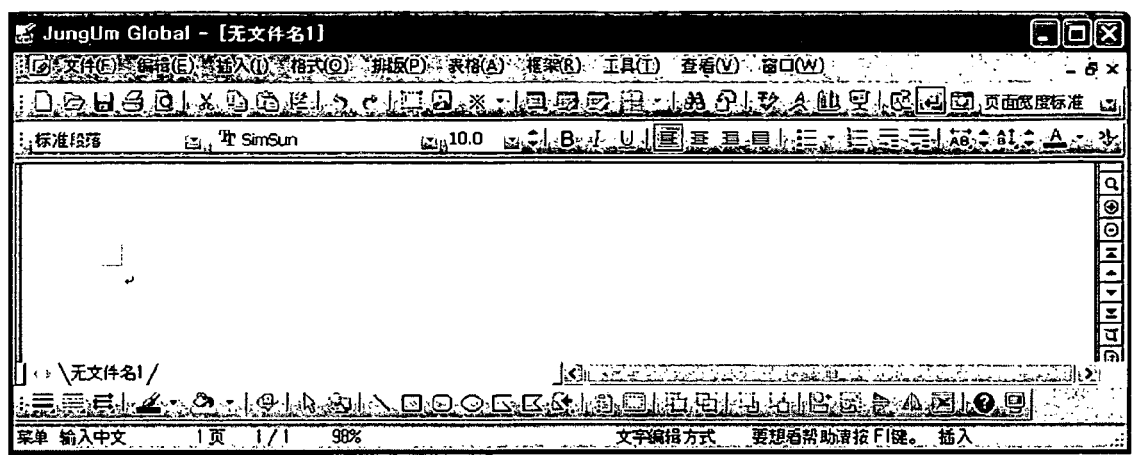
FIG. 14 illustrates a display of an application to which Chinese has been applied according to an exemplary embodiment of the present invention.
Figure 15:
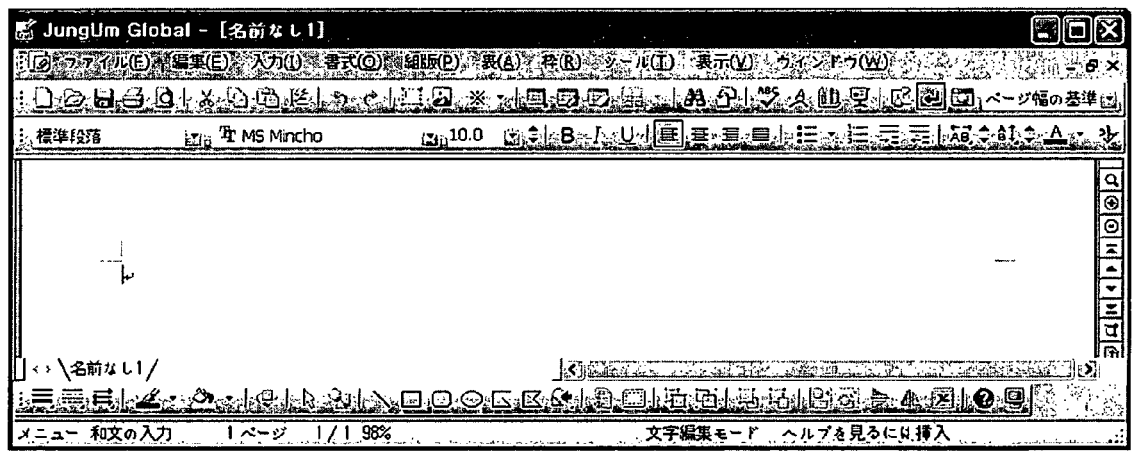
FIG. 15 illustrates a display of an application to which Japanese has been applied according to an exemplary embodiment of the present invention.

Applications to which English, Chinese and Japanese are applied as selected by the user are displayed in FIGS. 13 to 15 respectively.

The user can support multiple languages in a single application through the resource data generated by the resource data generation unit 110, without producing separate applications for each language. Languages that can be supported by the application may be added, deleted or modified only through the resource data.

As described above, the multiple language support system and method for an application according to the present invention produce at least one of the following effects.

First, since a single application can support multiple languages through resource data, inconveniences resulting from installing, managing and developing separate applications for each language can be eliminated.

Second, since an application can be executed independently of an operating system, the application can be used irrespective of the language supported by the operating system.

It will be understood by those of ordinary skill in the art that various replacements, modifications and changes in the form and details may be made therein without departing from the spirit and scope of the present invention as defined by the following claims. Therefore, it is to be appreciated that the above described exemplary embodiments are for purposes of illustration only and is not to be construed as a limitation of the invention.

What is claimed is:

1. A multiple language support system for an application, the system comprising:
   a resource data management unit for storing first resource data corresponding to multiple languages available in the application in a memory, the stored first resource data includes at least one of Menu, Help, Toolbar, Icon, Dialog and Font for a language, and information on a country;
   a resource data processing unit for extracting second resource data corresponding to a selected language from the first resource data when a user selects a predetermined language in the application and applying the extracted resource data to the application; and
   a language conversion unit for converting a language of data transmitted between the application and the operating system when the languages of the operating system and the application are different,
   wherein the language conversion unit converts the data received in the language of the application from the application into data in the language supported by the operating system, and transmits the converted data to the operating system,
   wherein the language conversion unit converts commands in a language of data transmitted from the operating system into commands in a common language used by all applications, and transmits the converted data to the application, and
   wherein the stored first resource data is received through a predetermined communication medium or a predetermined recording medium.

2. The system of claim 1, wherein the resource data processing unit supplies a predetermined graphical user interface which allows a user to change a language of the application while the application is executing.

3. The system of claim 2, wherein the resource data management unit updates the extracted resource data according to resource data corresponding to the language changed through the graphical user interface.

4. A multiple language support method for an application executed on a computer device comprising a processor having computer device-executable instructions, the method comprising:
   storing first resource data in multiple languages available in the application in a memory, the stored first resource data includes at least one of Menu, Help, Toolbar, Icon, Dialog and Font for a language, and information on a country;
   extracting second resource data corresponding to a selected language from the first resource data when a user selects a predetermined language in the application, and applying the extracted resource data to the application; and converting a language of data transmitted between the application and the operating system, when the languages of the operating system and the application are different,
   wherein the data received in the language of the application from the application is converted into data in the language supported by the operating system, and the converted data is transmitted to the operating system,
   wherein the converting the language of data transmitted between the application and the operating system comprises converting commands in a language of data transmitted from the operating system into commands in a common language used by all applications, and transmitting the converted data to the application, and
   wherein the stored first resource data is received through a predetermined recording medium or a predetermined communication medium.

5. The method of claim 4, further comprising supplying a predetermined graphical user interface to allow a user to change a language of the application while the application is executing.

6. The method of claim 5, wherein the applying the extracted resource data to the application comprises updating the extracted resource data according to resource data corresponding to the language changed through the graphical user interface.

7. The system of claim 1, wherein the language conversion unit receives the data in the language of the application, and
wherein the language of the received data is the common language used by all applications.

8. The system of claim 1, wherein the resource data management unit stores the second resource data according to the user's language selection for the application.

9. The system of claim 1, wherein the stored first resource data comprises an environment variable included in a set of functions.

10. The system of claim 4, wherein in converting the data received in the language of the application from the application, the language of the received data is the common language used by all applications.

11. The method of claim 4, wherein the storing the first resource data comprises storing the second resource data according to the user's language selection for the application.

12. The method of claim 4, wherein the stored first resource data comprises an environment variable included in a set of functions.

* * * * *